United States Patent
Aigner et al.

(10) Patent No.: US 10,071,752 B2
(45) Date of Patent: Sep. 11, 2018

(54) MOVABLE FOOTBOARD FOR A VEHICLE DOOR

(71) Applicant: KNORR-BREMSE GMBH, Mödling (AT)

(72) Inventors: Mathias Aigner, Gresten (AT); Thomas Höller, Ferchnitz (AT); Martin Märzendorfer, Amstetten (AT)

(73) Assignee: KNORR-BREMSE GMBH (AT)

( * ) Notice: Subject to any disclaimer, the term of this patent is extended or adjusted under 35 U.S.C. 154(b) by 155 days.

(21) Appl. No.: 15/302,528

(22) PCT Filed: Mar. 17, 2015

(86) PCT No.: PCT/AT2015/050068
§ 371 (c)(1),
(2) Date: Oct. 7, 2016

(87) PCT Pub. No.: WO2015/154111
PCT Pub. Date: Oct. 15, 2015

(65) Prior Publication Data
US 2017/0021842 A1    Jan. 26, 2017

(30) Foreign Application Priority Data
Apr. 7, 2014 (AT) .................................. A 263/2014

(51) Int. Cl.
*B61D 23/02* (2006.01)
*B60R 3/02* (2006.01)
*B61D 1/00* (2006.01)

(52) U.S. Cl.
CPC .............. *B61D 23/025* (2013.01); *B60R 3/02* (2013.01); *B61D 1/00* (2013.01)

(58) Field of Classification Search
CPC ...................... B61D 23/00–23/025; B60R 3/02
See application file for complete search history.

(56) References Cited

U.S. PATENT DOCUMENTS

| 1,802,926 A | 4/1931 | Paul |
| 4,685,858 A * | 8/1987 | Manning ................ A61G 3/061 |
| | | 280/166 |

(Continued)

FOREIGN PATENT DOCUMENTS

| CN | 201214390 Y | 4/2009 |
| CN | 201610142 U | 10/2010 |

(Continued)

OTHER PUBLICATIONS

Search report for International Patent Application No. PCT/AT2015/050068 dated Jul. 27, 2015.

(Continued)

*Primary Examiner* — Zachary L Kuhfuss
(74) *Attorney, Agent, or Firm* — Barnes & Thornburg LLP

(57) ABSTRACT

A movable footboard for a door of a rail vehicle comprises a footboard extendable below a tread strip at least substantially transversely to the direction of travel. To minimize the level difference between the footboard and the tread strip a pivot shaft extends at least substantially parallel to the direction of travel on at least one longitudinal bar of the footboard at the end region of the footboard away from the vehicle, about which pivot shaft at least two pivoting bars are pivotably supported, which pivoting bars each bear a transverse profile element, each of the pivoting bars being rigidly connected to the transverse profile element associated with the pivot bar, while the other transverse profile elements lie freely on said pivot bar, and a lifting mechanism is fastened to the vehicle and lifts the transverse profile element located directly in front of the tread strip.

6 Claims, 10 Drawing Sheets

(56) References Cited

U.S. PATENT DOCUMENTS

| | | | | |
|---|---|---|---|---|
| 5,253,410 | A * | 10/1993 | Mortenson | B60P 1/431 14/71.1 |
| 5,357,869 | A * | 10/1994 | Barjolle | A61G 3/061 105/425 |
| 5,775,232 | A * | 7/1998 | Golemis | B61D 23/025 105/458 |
| 6,167,816 | B1 * | 1/2001 | Lavery | B61D 23/025 105/458 |
| 7,451,512 | B2 * | 11/2008 | Fullerton | A61G 3/063 14/69.5 |
| 8,132,281 | B1 * | 3/2012 | Johnson | B60P 1/433 14/71.3 |
| 8,151,715 | B2 * | 4/2012 | Zandona' | B61D 23/02 105/443 |
| 8,359,691 | B2 * | 1/2013 | Morris | A61G 3/061 14/71.3 |
| 8,505,141 | B1 * | 8/2013 | Morris | A61G 3/061 14/71.1 |
| 2004/0146385 | A1 * | 7/2004 | Edwards | B60P 1/431 414/537 |
| 2006/0245883 | A1 * | 11/2006 | Fontaine | A61G 3/061 414/537 |
| 2007/0221442 | A1 | 9/2007 | R.C. | |
| 2008/0187425 | A1 | 8/2008 | Morris et al. | |
| 2008/0271268 | A1 * | 11/2008 | Johnson | A61G 3/061 14/71.1 |
| 2008/0276832 | A1 | 11/2008 | Chisena | |
| 2009/0271934 | A1 * | 11/2009 | Morris | A61G 3/061 14/71.3 |
| 2011/0133426 | A1 | 6/2011 | Coochesfahani | |
| 2012/0030886 | A1 * | 2/2012 | Persson | B60R 3/02 14/71.1 |
| 2017/0044819 | A1 * | 2/2017 | Krueger | B61D 19/02 |
| 2017/0137038 | A1 * | 5/2017 | Krueger | B61D 23/02 |

FOREIGN PATENT DOCUMENTS

| | | | |
|---|---|---|---|
| CN | 102378706 A | 3/2012 | |
| CN | 202480990 U | 10/2012 | |
| DE | 102014206184 A1 * | 10/2015 | B61D 23/025 |
| EP | 1859996 A1 * | 11/2007 | A61G 3/061 |
| EP | 2616279 B1 | 7/2013 | |
| WO | WO-02071995 A1 * | 9/2002 | B60P 1/4421 |
| WO | 02079018 A1 | 10/2002 | |
| WO | 2005108161 A1 | 11/2005 | |
| WO | 2009081116 A1 | 7/2009 | |
| WO | 2012035261 A1 | 3/2012 | |

OTHER PUBLICATIONS

Austrian Office Action corresponding to A 263/2014, dated Jan. 1, 2015.

Chinese Office Action corresponding to ACN 201580017860.9, dated Oct. 10, 2017.

* cited by examiner

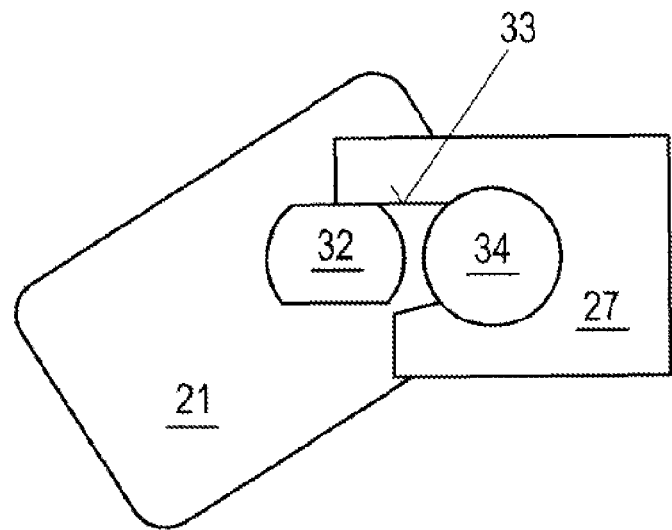
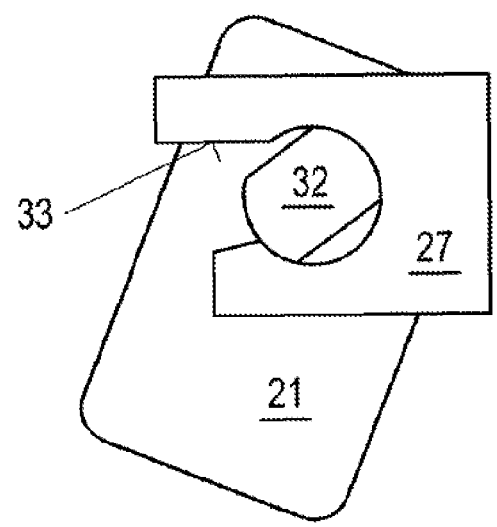
Fig. 11

MOVABLE FOOTBOARD FOR A VEHICLE DOOR

CROSS REFERENCE AND PRIORITY

Priority Paragraph

This patent application is a U.S. National Phase of International Patent Application No. PCT/AT2015/050068, filed Mar. 17, 2015, which claims priority to Austrian Patent Application No. A 263/2014, filed 7 Apr. 2014, the disclosure of which are incorporated herein by reference in their entirety.

FIELD

Disclosed embodiments relate to a movable footboard for the doors of vehicles, in particular of rail carriages.

BACKGROUND

Rail carriages are intended in the description and the claims to be understood to be all rail-bound vehicles for passenger transport whether these be trams, underground trains, high-speed trains, local trains or passenger trains. Disclosed embodiments is intended in particular for such applications but can also advantageously be used with other vehicle doors.

With such vehicles, there is in many cases a problem that, when stopping in a station, there is between the floor, actually the so-called footrail, which constitutes the door-side end region thereof, on the one hand, and the platform, on the other hand, a gap in a horizontal direction and in many cases also a height difference. Various proposals have already been submitted for providing bridges for this gap either together with the opening of the door or independently thereof, but all these attempts involve different disadvantages and there inevitably also remains after a footboard has been extended a height difference between the upper floor edge of the carriage and the adjacent upper footboard edge.

Another type of bridging comprises a so-called ramp which is always extended by the same length, comes to rest with the front thereof on the platform and is then raised with the carriage-side end until a consistent level is produced. The great disadvantage lies in the dangers which arise during the pushing-out action over the platform and in some cases also in the contact region with the tread step.

A lowering or pivoting of the footrail onto the extended footboard has also been proposed, but as a result of the structural height of the footrail there is no actual balancing of the levels in this instance and in this instance the risk of jamming on the one hand and disruption as a result of contamination on the other hand is too great to permit general use or even implementation.

SUMMARY

Disclosed embodiments may solve or at least reduce this problem, consequently to provide an extendable footboard in which in the extended state ready for operation, even with different extension extents, the height difference between the upper floor edge (footrail) and the upper footboard edge is significantly reduced or eliminated.

Disclosed embodiments, by the measures and features set out herein, for example, the footboard has on the surface thereof accessible or passable elements which can be raised, thus reduce or eliminate the height difference.

BRIEF DESCRIPTION OF FIGURES

Disclosed embodiments is explained in greater detail below with reference to the drawings, in which:

FIG. 11 shows another detail.

DETAILED DESCRIPTION

Figure 1:
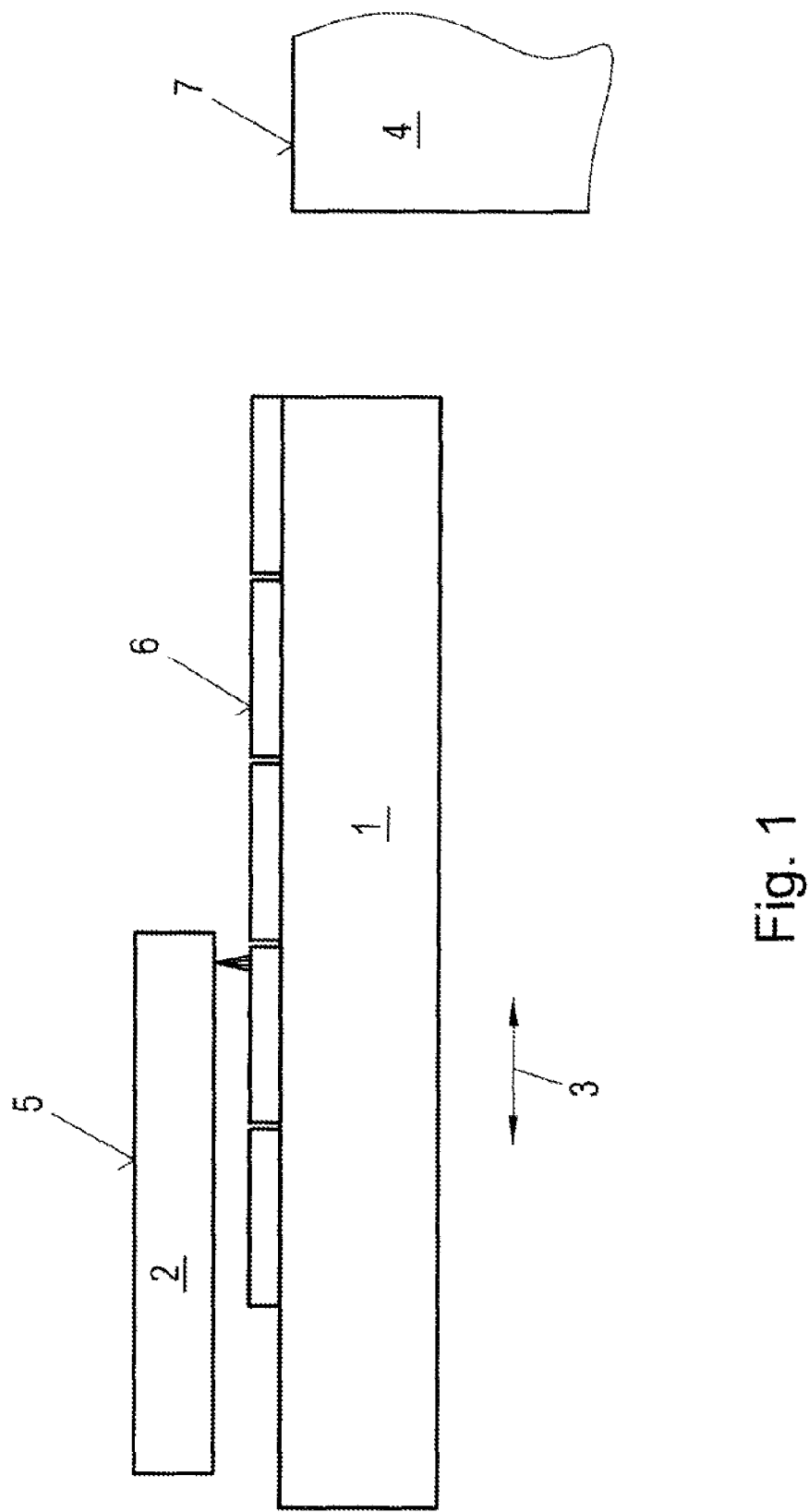
FIG. 1 shows a footboard according to Disclosed embodiments in a partially extended position.

A footboard which is generally designated 1 is arranged below a footrail 2 of a carriage body which is not otherwise illustrated in greater detail in the door region. The footboard 1 can be displaced in a substantially horizontal direction transversely relative to the travel direction parallel with the double-headed arrow 3. The displacement is carried out between a completely retracted position in which the footboard 1 does not protrude beyond the clearance profile and an extended position in which the footboard 1 is moved as close to a platform 4 as is technically possible. FIG. 1 shows an intermediate position of the footboard 1 and there can clearly be seen the height differences between the upper floor edge 5, the surface 6 of the footboard 1 and the upper platform edge 7.

Figure 2:
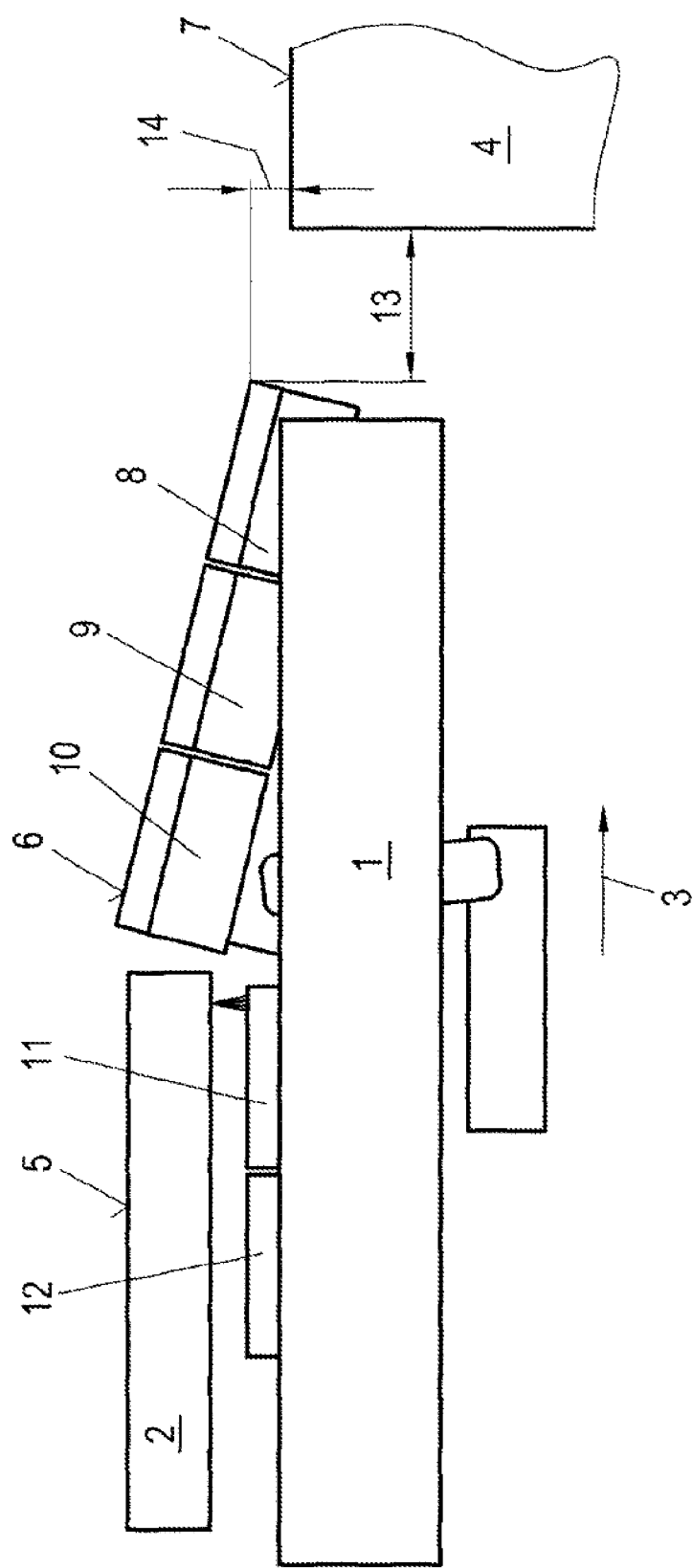
FIG. 2 shows the footboard in a raised position ready for use.

FIG. 2 shows the situation in the state ready for operation in a view similar to that of FIG. 1: the footboard 1 is in the extension direction of the arrow 3 extended so far that as many of the movable transverse profiles 8-12 thereof as possible can be lifted in the manner shown. The mechanism by means of which the lifting is carried out is explained in greater detail below.

The illustrated position of FIG. 2 shows that, when the footboard 1 is further pushed out, only a portion of the transverse profile 11 would protrude below the footrail 2 so that it would not be possible to lift the transverse profile 11. For this reason, the pushing-out action terminates in the illustrated position, under some circumstances slightly further out, in order to divide the remaining gap 13 over two regions in an appropriate manner in accordance with the prevailing philosophy of the rail operator or the legal situation or the standards which can be applied.

As a result of the lifting of the transverse profiles 8, 9 and 10 in the form of a pivot movement, it is possible for the accessible face which is formed by the transverse profiles to be continued in the region of the upper floor edge 5 without any height offset. This is particularly important and advantageous for access to this face, for use with wheelchairs, pushchairs, and the like.

The remaining gap 13 is always smaller than the length of the transverse profiles in the pushing-out direction and consequently negligibly small in comparison with current solutions.

Figure 3:
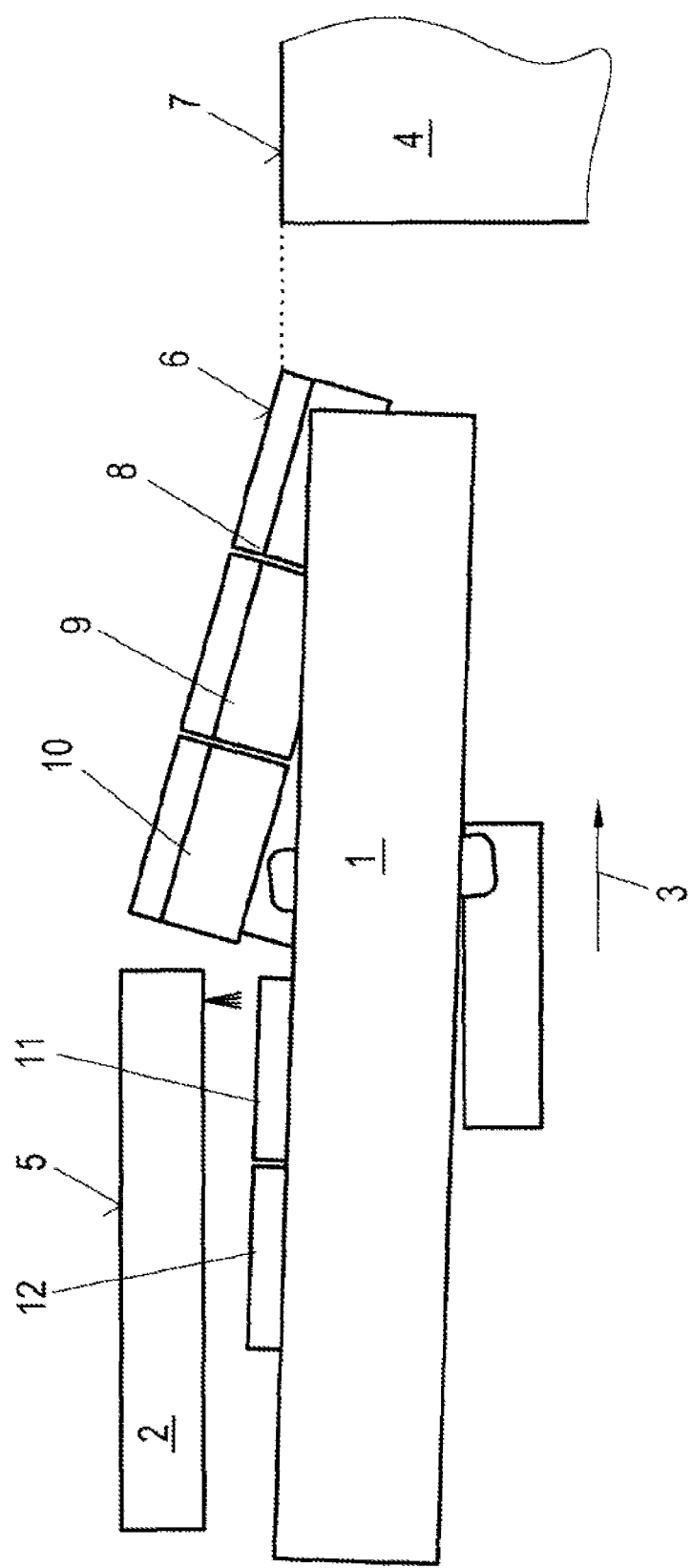
FIG. 3 shows the situation of FIG. 2 in a variant.

FIG. 3 shows a variant of FIG. 2 in which the footboard 1 is arranged so as to be able to be adjusted in terms of height, for example, so as to be able to be pivoted as illustrated, whereby the height difference 14 between the end of the transverse profile 8 and the upper platform edge 7 can be reduced or eliminated. The horizontal line 15 represents this in a striking manner.

Figure 4:
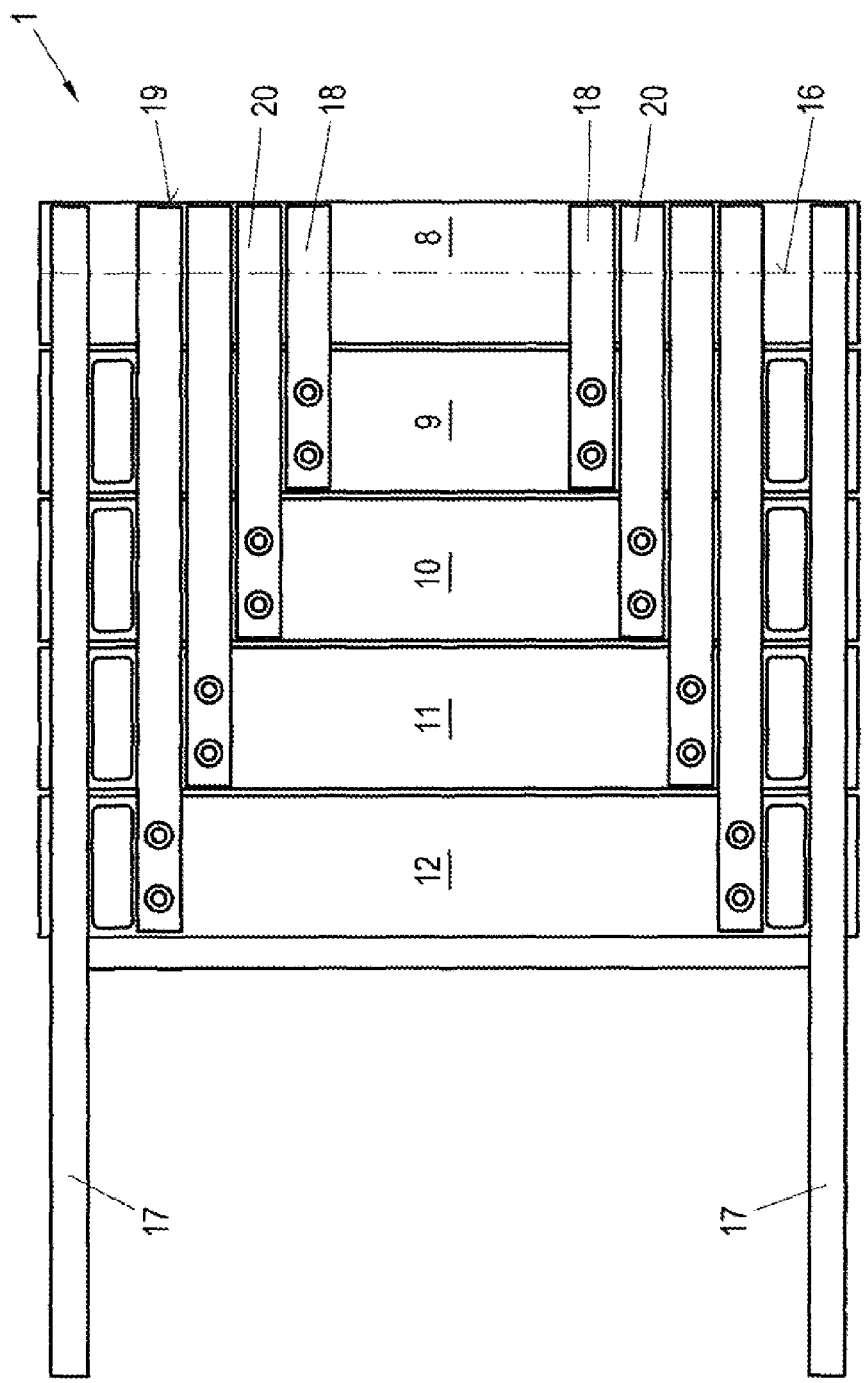
FIG. 4 is a bottom view of a footboard according to Disclosed embodiments.

FIG. 4 is a bottom view of the footboard 1 from which the construction is clearly evident. At the free end of two longitudinal struts 17, the foremost transverse profile 8 is secured so as to be able to be pivoted about a longitudinal axis 16 which is at least substantially parallel with the travel direction. Below the transverse profile 8 there protrudes a pair of pivot struts 18, which are also pivotably supported about the longitudinal axis 16, from the free edge 19 toward the carriage body, the pivot struts 18 are securely connected to the next transverse profile 9. The same applies to a pair of additional pivot struts 20 and the transverse profile 10 and so on (without any reference numeral) until the last transverse profile 12. Of course, it is possible to provide in each case only one pivot strut or also more than two.

As a result of this construction, when one of the transverse profiles 8 to 12 is lifted via the configuration of the pivot struts 18 to 20, etcetera, away from the free edge 19, each of the transverse profiles which are located therebetween is lifted whilst the profiles which are located further away therefrom at the carriage body side continue to remain resting on the longitudinal struts 17. Five transverse profiles are illustrated; there may be more or fewer; at least two are necessary in order to be used in an advantageous manner.

Figure 5:
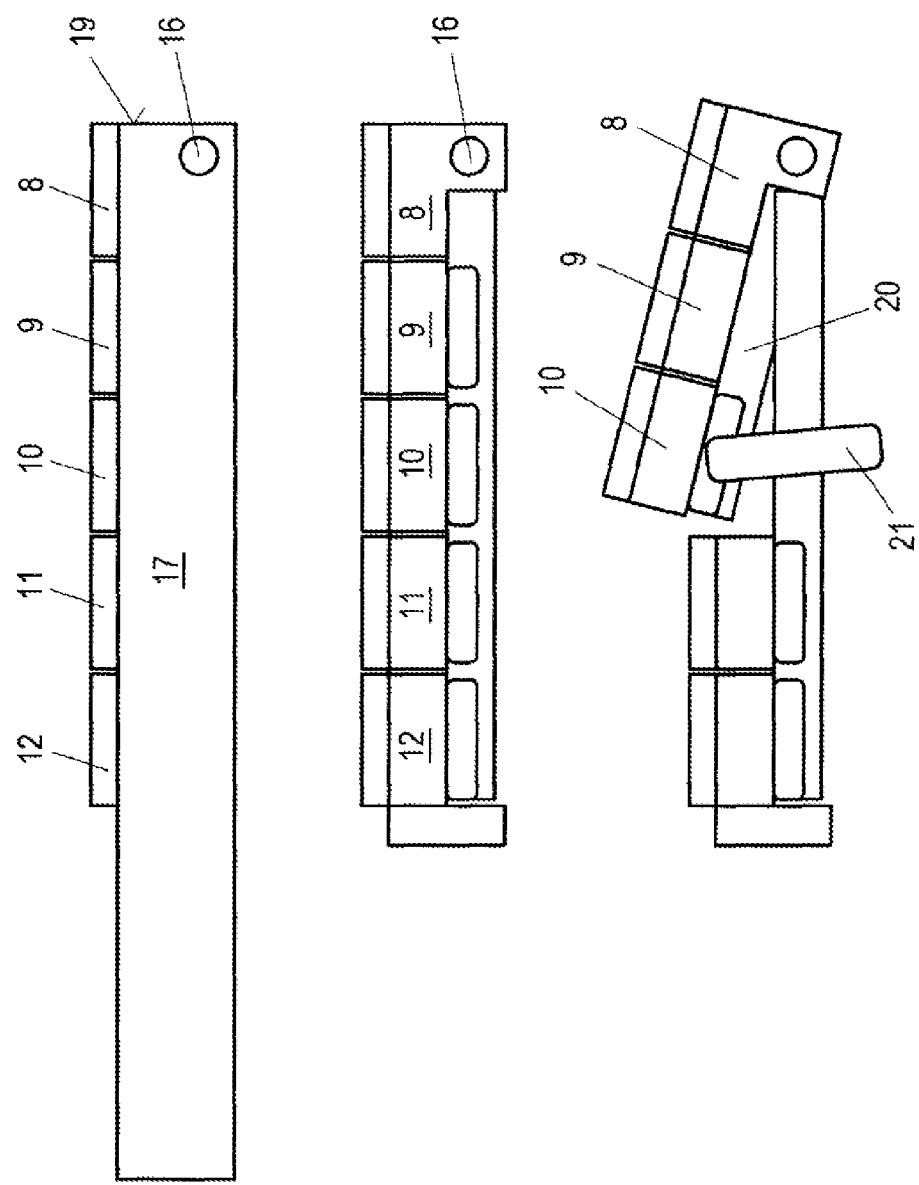
FIG. 5 shows a first variant of the lifting mechanism.

This operating method becomes clear when viewed together with FIG. 5, which in the first illustration thereof shows a side view with all the transverse profiles resting on the longitudinal struts 17, the second illustration shows a schematic section in which the construction of the transverse profiles 8 to 12 can be seen clearly and the third illustration shows how the transverse profile 10 is raised by a rotary element 21 and, by means of the pivot struts 20 thereof, also pivots, and consequently raises, the transverse profiles 8 and 9 which are closer to the free edge 19 than the transverse profile 10 about the pivot axle 16.

Figure 6:
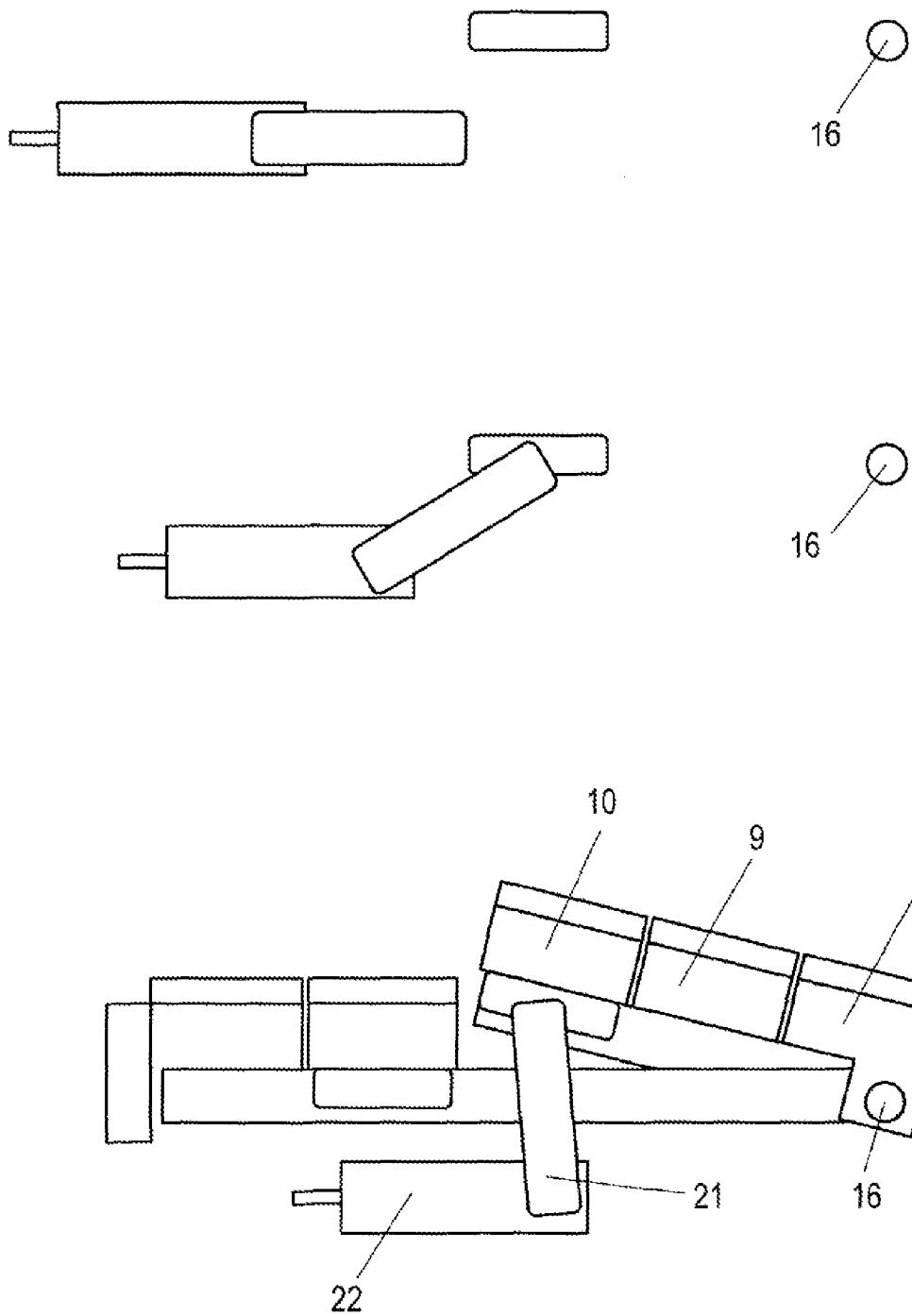
FIGS. 6 and 7 show variants of the lifting mechanism as views similar to FIG. 5 in three different positions.

FIG. 6 shows in a purely schematic manner how the rotary element 21 is rotated by means of a linear drive 22 in such a manner that in this instance it raises the transverse profile which is located in the region thereof, in this instance the transverse profile 10.

It is clear that the rotary element 21, the bearing thereof and associated linear drive 22 are arranged so as to be secured to the carriage body in order to in each case raise the transverse profile which is located in the correct position with respect to the footrail 2 or the front edge thereof.

Figure 9:
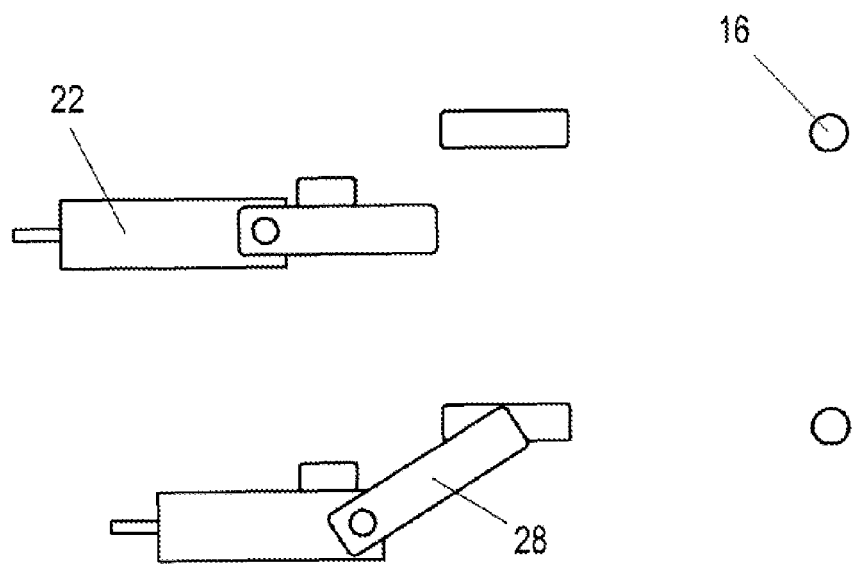
FIGS. 9 and 10 show two details.

FIG. 9 shows a mechanism which is very suitable for this movement. A linear drive 22 which can be moved linearly back and forth in the pushing-out direction has at the front end region thereof a folding axis 28 which is substantially parallel with the longitudinal axis 16. There is pivotably supported about this folding axis 28 a rotary element 21 which is under the force of a torque in a counter-clockwise direction and which, during the pushing-out movement, moves along below a guiding portion until it has moved past it and folds upward as a result of the action of the torque.

As the second illustration of FIG. 9 shows, the rotary element engages in the lifting portion 27 of the associated transverse profile 8-12 and lifts it upward, as illustrated in greater detail in FIG. 11.

Figure 10:
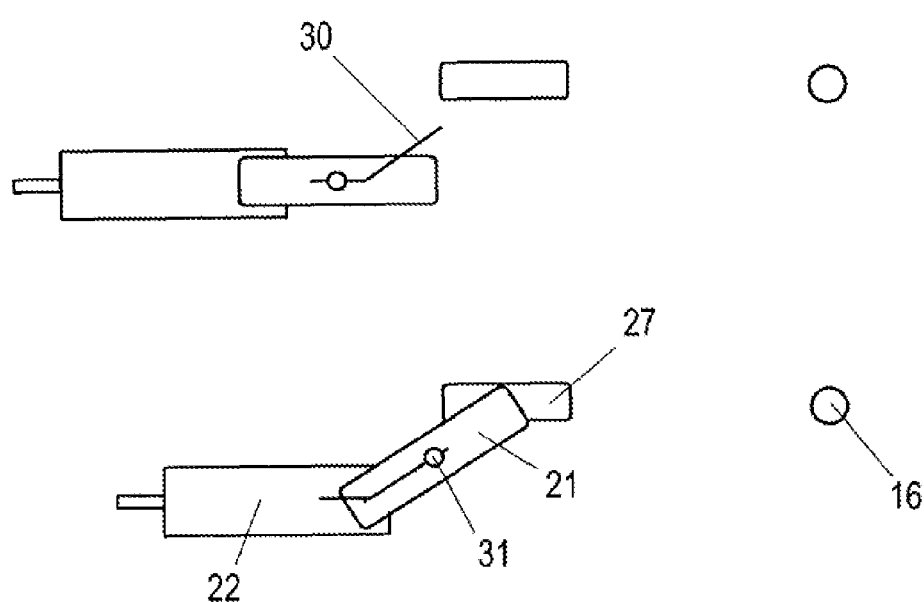

FIG. 10 shows a variant in which in place of the guiding portion 29 there is arranged on the carriage body a guiding rail 30, in which a pin 31 of the rotary element 21 engages; they are actually guiding elements which are provided at both sides of the rotary element. The rotary element 21 is in turn pivotably connected to the linear drive 22. FIG. 11 shows a configuration of the connection between the rotary portion 21 and lifting portion 27, which configuration is advantageous to use. A flattened pin 32 of the rotary portion 21 whose angular position on the rotary portion 21 correlates to the angular position thereof at the time of the engagement strikes a catch face 33 of the lifting portion and when the linear drive 22 moves further (FIG. 9, 10) is pushed into a circular recess 34. When the pin 32 reaches the end of the recess 34, the horizontal movement comes to an end and the pin 32 moves as a result in a vertical direction, wherein, as a result of the rotation of the pin, it is secured in the recess 34 in a positive-locking manner.

Figure 7:
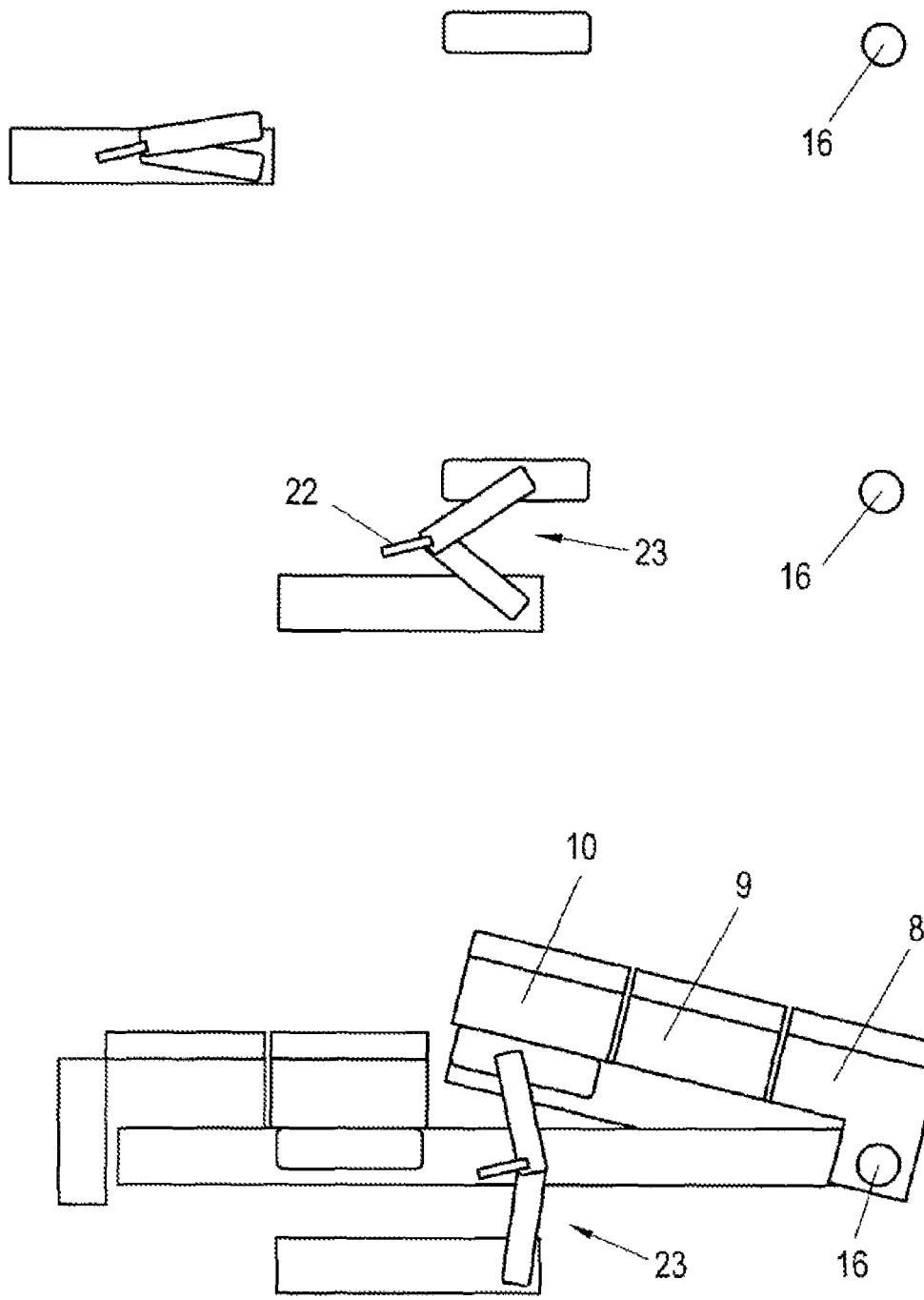

FIG. 7 shows a variant of FIG. 6 relating to the lifting mechanism, in this instance, in place of a pure rotational movement of a rotary element 21, an expansion movement of an expansion element 23 is again brought about by means of a linear drive 22. In this instance, the connection between the rotary element 21 and lifting portion 27 can also be carried out as described above.

Figure 8:
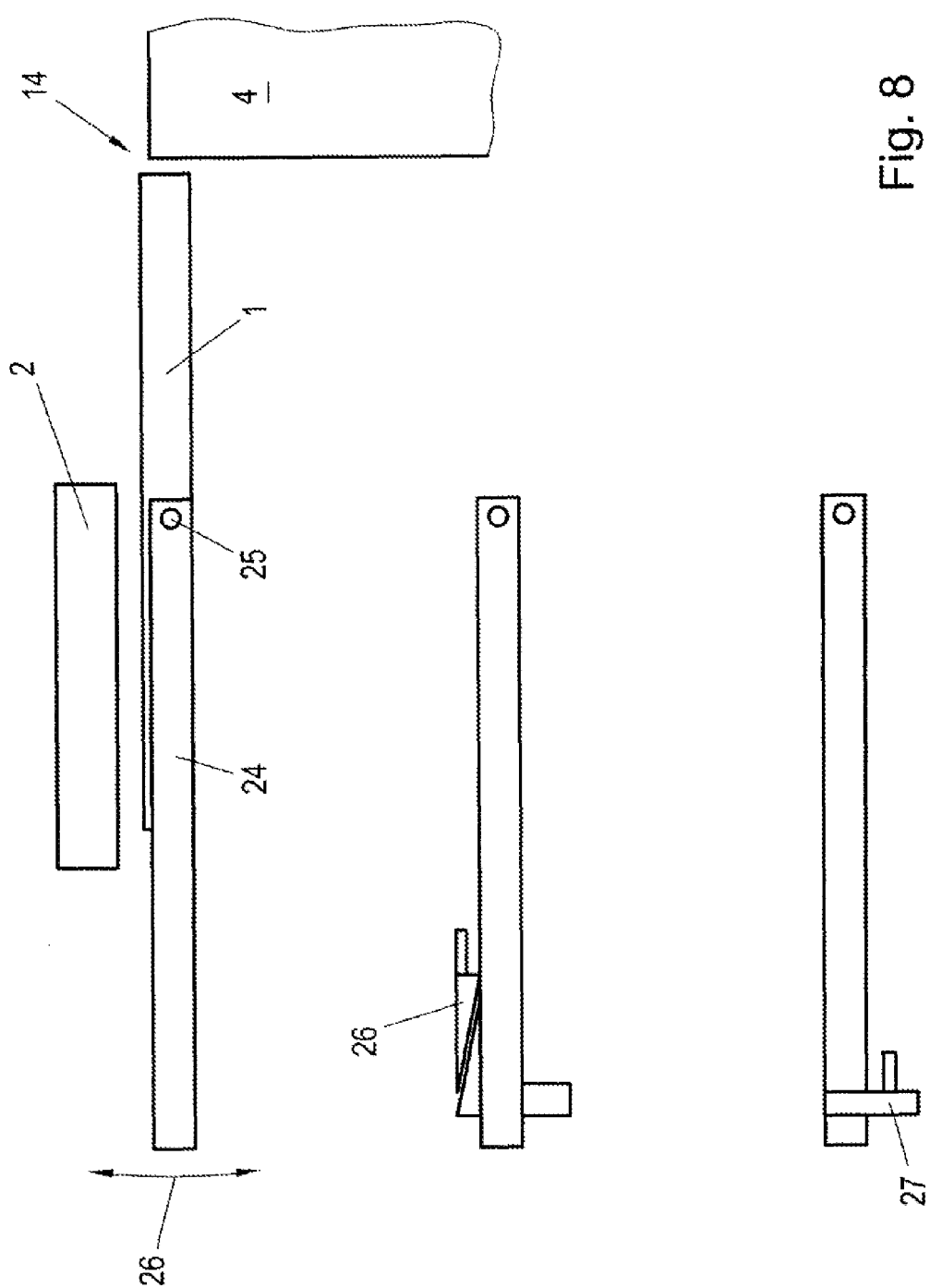
FIG. 8 shows an embodiment of Disclosed embodiments.

FIG. 8 shows, also in a purely schematic manner, one possibility for the reduction or elimination of the height difference 14 (FIG. 2) between the free end of the footboard and the upper platform edge: a guide 24 for the footboard 1 is in turn pivotably supported about a guiding axis 25 which extends parallel with the longitudinal carriage axis. Using a pivot mechanism, for example, a movable dual wedge 26, or a linear drive such as a spindle or a hydraulic or pneumatic cylinder/piston unit, the guide 24 and consequently the footboard 1 can be pivoted about the guiding axis 25 and can thus compensate for the height difference 14. The double-headed arrow 26 indicates this movement; how it is limited is dependent on the respective vehicle and the provisions of the rail administration.

Disclosed embodiments is not limited to the embodiment illustrated and described, but instead can be modified in different manners. It is thus possible not to arrange the lifting mechanism with the rotary element 21 or the expansion element 23 in a duplicate manner and at the lateral edge of the footboard 1, but instead centrally and only in single form; the division of the remaining horizontal gap 13 at the side of the platform 4 or at the side of the floor 2 can be carried out differently from the way set out, but this then requires an adaptation of the position or the extent of the lifting action of the lifting mechanism in order not to unintentionally form a height difference, even a small height difference, in the region of the upper floor edge since the engagement location of the lifting mechanism with respect to the transverse profile then changes in accordance with the remaining gap width.

The construction of the lifting mechanism may deviate from the illustrated examples; it is possible to provide a fixed hydraulic or pneumatic piston/cylinder unit which presses the respective transverse profile upward in a purely non-positive-locking manner, and the like.

It is possible to use as materials, substances and components all those which are known in the prior art for retractable steps or folding steps; in the knowledge of Disclosed embodiments and in the knowledge of the field of the object and the vehicle to be equipped there are no problems in this regard for the person skilled in the art.

In summary, it can consequently be set out that Disclosed embodiments substantially relates to a movable footboard for a door of a vehicle, in particular a rail vehicle, having a footboard 1 which can be extended below the footrail 2 at least substantially transversely relative to the travel direction. In order to improve the connection between the footboard and footrail, there is provision for there to be provided at the end region of the footboard 1 remote from the vehicle on at least one longitudinal strut 17 of the footboard 1 a pivot axle 16 which extends at least substantially parallel with the travel direction and about which there are pivotably supported at least two pivot struts 18, 20 which each carry a transverse profile 8-12. In this instance, each of the pivot struts, as illustrated, may be divided into two aligned pivot struts in order to improve the mechanical and dynamic situation; there are also provided in most cases more than two such pivot struts in order to be able to provide more than two transverse profiles 8-12. Furthermore, each of the pivot struts is only securely connected to the transverse profile 8-9 which is associated therewith, whilst the other transverse profiles are freely positioned thereon. Finally, there is provided a lifting mechanism 21, 22, 23 which is secured to the vehicle and which lifts only the transverse profile 8-12 which is located directly in front of the footrail 2.

LIST OF REFERENCE NUMERALS

1. Footboard
2. Footrail
3. Double-headed arrow
4. Platform
5. Upper floor edge
6. Surface
7. Upper platform edge
08-12. Transverse profiles
13 Gap
14 Height difference
15 Horizontal
16 Pivot axle
17 Longitudinal struts
18 Pivot struts
19 Free edge
20 Pivot struts
21 Rotary element
22 Linear drive
23 Expansion element
24 Guide
25 Guiding axis
26 Arrow
27 Lifting portion
28 Folding axis
29 Guiding portion
30 Guiding rail
31 Pin
32 Flat pin
33 Catch face
34 Recess

The invention claimed is:

1. A movable footboard for a door of a rail vehicle, the movable footboard comprising:
    a footboard extendable below a footrail at least substantially transversely relative to a travel direction,
    wherein there is provided, at an end region of the footboard, remote from the vehicle on at least one longitudinal strut of the footboard, a pivot axle which extends at least substantially parallel with the travel direction and about which there are pivotably supported at least two pivot struts which each carry a transverse profile,
    wherein each of the pivot struts is securely connected only to the transverse profile which is associated therewith, whilst the other transverse profiles are freely positioned thereon, and
    wherein there is provided, in a state secured to the vehicle, a lifting mechanism which either comprises a rotary element and a linear drive or comprises a linear drive and expansion elements, and which lifts the transverse profile which is located directly in front of the footrail.

2. The footboard of claim 1, wherein the lifting mechanism has a linear drive which is arranged below the footboard and a rotary element which is connected thereto so as to be rotatable about a folding axis, and
    wherein the rotary element is rotated by the linear drive and thus folds upward the transverse profile, which is located above the rotary element.

3. The footboard of claim 2, wherein the footboard is movably supported in a guide on the vehicle,
    wherein the guide is pivotably supported about a guiding axis in the region of the footrail, and
    wherein, in the remote end region of the guide, there is provided a drive which pivots this end region about the guiding axis.

4. The footboard of claim 1, wherein the lifting mechanism has a linear drive which is arranged below the footboard and an expansion element which has two elements is rotatable about a common expansion axis, and
    wherein the linear drive acts on one of these elements in the region of the expansion axis or on the expansion axis itself.

5. The footboard of claim 4, wherein the footboard is movably supported in a guide on the vehicle,
    wherein the guide is pivotably supported about a guiding axis in the region of the footrail, and
    wherein, in the remote end region of the guide, there is provided a drive which pivots this end region about the guiding axis.

6. The footboard of claim 1, wherein the footboard is movably supported in a guide on the vehicle,
    wherein the guide is pivotably supported about a guiding axis in the region of the footrail, and
    wherein in the remote end region of the guide there is provided a drive which pivots this end region about the guiding axis.

* * * * *